UNITED STATES PATENT OFFICE.

GEORGE E. VAN DERBURGH, OF NEW YORK, N. Y., ASSIGNEE, BY MESNE ASSIGNMENTS, OF SAID G. E. VAN DERBURGH.

IMPROVED SILICATED SOAP.

Specification forming part of Letters Patent No. 31,648, dated March 5, 1861; Reissue No. 1,430, dated March 10, 1863.

*To all whom it may concern:*

Be it known that I, GEORGE E. VAN DERBURGH, of the city, county, and State of New York, have invented a new Composition of Matter in the shape of an Improved Article of Soap; and I do hereby declare that the following is a full and exact description of the process of producing said soap.

I take any of the known soaps of commerce and first reduce them to a fluid state, and then I add thereto any desired proportion of a dissolved alkaline silicate which contains, by chemical analysis, less than one-half as much potash or less than one-third as much soda as silica, and then, after thoroughly incorporating the said mixture of soap and dissolved silicate, while they are kept at a proper temperature, I run the mixture into frames to harden, and afterward cut the same into merchantable shape.

Of the samples of my improved silicious soap which accompany this application for a patent, those numbered from 1 to 8, inclusive, were produced from the ordinary yellow soap of commerce, (composed of tallow, soda, and rosin,) and various proportions of a dissolved alkaline silicate of the above-mentioned character, which possessed the specific gravity of 1,320 at the temperature of 60° Fahrenheit, the said ingredients having been combined with each other in the following proportions, viz: No. 1 contains one hundred parts of soap to twenty-five parts dissolved silicate, No. 2 contains one hundred parts of soap to fifty parts dissolved silicate, No. 3 contains one hundred parts of soap to seventy-five parts dissolved silicate, No. 4 contains one hundred parts of soap to one hundred parts dissolved silicate, No. 5 contains one hundred parts of soap to one hundred and twenty-five parts dissolved silicate, No. 6 contains one hundred parts of soap to one hundred and fifty parts dissolved silicate, No. 7 contains one hundred parts of soap to one hundred and seventy-five parts dissolved silicate, No. 8 contains one hundred parts of soap to two hundred parts dissolved silicate; and the remaining samples of said soap—viz., those numbered from 9 to 12, inclusive—were produced from the same quality of brown soap as that above referred to and a quality of the above-mentioned dissolved silicate which possessed the specific gravity of 1.150 at the temperature of 60° Fahrenheit, the said ingredients having been combined with each other in the following proportions, viz: No. 9 contains one hundred parts of soap to one hundred parts dissolved silicate, No. 10 contains one hundred parts of soap to eighty parts dissolved silicate, No. 11 contains one hundred parts of soap to fifty parts dissolved silicate, No. 12 contains one hundred parts of soap to twenty-five parts dissolved silicate.

Numerous practical experiments conducted by different persons have fully established the following positions, viz: The ordinary soap of commerce, when improved by the combination therewith of about an equal proportion of the above-mentioned quality of dissolved alkaline silicate, possesses greatly superior detergent properties, and consequently by its use the dirt is removed from articles of clothing, &c., with much less frictional labor than when the ordinary brown soaps of commerce are employed, and the effect upon the hands of the operator while using the said improved soap is such that they are left in as soft and smooth a condition as they were at the commencement. The said improved soaps are also firmer, harder, and more compact than the ordinary soaps, and consequently they do not dissolve and wash away as rapidly as other description of soaps. The linen cleansed by my improved soap is also left in a whiter and clearer condition than when other soaps are employed in the washing process, and nearly or quite as good results are produced when the said washing process is accomplished with hard water as when soft water is employed. My said improved soap may also be produced by thoroughly incorporating a proper proportion of the before-mentioned quality of dissolved alkaline silicate with a batch of newly-formed soap while it is in a fluid state, and then drawing it off into the cooling-frames in the usual manner.

A dissolved alkaline silicate that was produced by the process which is covered by my patent of May 29, 1860, is the one which I have employed in the production of the within-described silicious soap; but any other dissolved alkaline silicate which contains by chemical analysis less than one-third as much soda or one-half as much potash as silica will perhaps answer an equally good purpose. I would, however, observe that, to the best of my knowledge and belief, my patented dissolved alkaline silicate above referred to is the only one yet produced the use of which in the production of soap would result in substantially the article for which I now ask the protection of a patent.

What I claim as my invention, and desire to secure by Letters Patent, is—

The use of a dissolved alkaline of silicate as an ingredient in and component of soap; but this I only claim when the dissolved alkaline silicate thus employed contains by chemical analysis less than one-third as much soda or less than one-half as much potash as silica.

GEORGE E. VAN DERBURGH.

Witnesses:
LEMUEL W. SERRELL,
THOS. GEO. HAROLD.